(12) United States Patent
Geigel

(10) Patent No.: US 12,265,801 B1
(45) Date of Patent: Apr. 1, 2025

(54) SYSTEM AND METHOD OF WORKFLOW DATABASE CREATION AND INTERACTION

(71) Applicant: Arturo Geigel, San Juan, PR (US)

(72) Inventor: Arturo Geigel, San Juan, PR (US)

(*) Notice: Subject to any disclaimer, the term of this patent is extended or adjusted under 35 U.S.C. 154(b) by 564 days.

(21) Appl. No.: 17/564,580

(22) Filed: Dec. 29, 2021

Related U.S. Application Data

(63) Continuation-in-part of application No. 16/235,369, filed on Dec. 28, 2018, now Pat. No. 11,243,971.

(51) Int. Cl.
*G06F 8/34* (2018.01)
*G06F 3/04817* (2022.01)

(52) U.S. Cl.
CPC ............ *G06F 8/34* (2013.01); *G06F 3/04817* (2013.01)

(58) Field of Classification Search
CPC ................................ G06F 8/34; G06F 3/04817
See application file for complete search history.

(56) References Cited

U.S. PATENT DOCUMENTS

| | | | |
|---|---|---|---|
| 5,495,567 A | 2/1996 | Iizawa et al. | |
| 8,078,643 B2 | 12/2011 | Mush et al. | |
| 8,078,982 B2 | 12/2011 | Freid et al. | |
| 8,103,951 B2 | 1/2012 | Schuller et al. | |
| 8,126,937 B2 | 2/2012 | Shaburov | |
| 8,239,778 B2 | 8/2012 | Sheth-Voss et al. | |
| 8,510,343 B2 | 8/2013 | Payzer et al. | |
| 8,639,712 B2 | 1/2014 | Schmeink et al. | |
| 8,683,315 B2 | 3/2014 | Stover | |
| 8,793,240 B2 | 7/2014 | Potapov et al. | |
| 8,819,068 B1 | 8/2014 | Knote et al. | |
| 8,898,203 B2 | 11/2014 | Leland et al. | |
| 8,909,597 B2 | 12/2014 | Aymeloglu et al. | |
| 8,914,422 B2 | 12/2014 | Hale et al. | |
| 9,002,884 B2 | 4/2015 | Lesser et al. | |
| 9,075,854 B2 | 7/2015 | Thomas et al. | |
| 9,165,055 B2 | 10/2015 | Bookman et al. | |
| 9,201,909 B1 | 12/2015 | Huang et al. | |
| 9,274,773 B2 | 3/2016 | Vickers et al. | |
| 9,372,671 B2 | 6/2016 | Balan et al. | |
| 9,501,725 B2 | 11/2016 | Vrcelj et al. | |
| 9,952,839 B2 | 4/2018 | Quine | |
| 9,971,778 B2 | 5/2018 | Vickers et al. | |
| 2006/0117057 A1 | 6/2006 | Legault et al. | |
| 2008/0301168 A1 | 12/2008 | Adler et al. | |
| 2012/0290940 A1 | 11/2012 | Quine | |
| 2013/0019225 A1 | 1/2013 | Peters et al. | |
| 2014/0317045 A1 | 10/2014 | Quine | |

*Primary Examiner* — Angie Badawi
(74) *Attorney, Agent, or Firm* — Luis Figarella

(57) ABSTRACT

A system and method of generating a workflow database creation and interaction schema from a graphical user interface used to create a form. The embodiments discloses the system that utilizes a drag and drop application that allows for configuration of a plurality of forms. These forms can then be placed in a graphical flow that will dictate the order of the forms. Through its graphical user interface, the system is able to gather information on field structure, flow among form elements, element identification, among other embodiments. This information allows the system to automate the creation of the database schema without user intervention.

6 Claims, 17 Drawing Sheets

SYSTEM AND METHOD OF WORKFLOW DATABASE CREATION AND INTERACTION

CROSS-REFERENCE TO RELATED APPLICATIONS

This application is a continuation-in-part of co-pending U.S. application Ser. No. 16/235,369 titled "System and Method of Database Creation Through Form Design", filed on Dec. 28, 2018, the disclosure of which is are herein incorporated by reference in its entirety.

FIELD OF THE INVENTION

The present invention relates to the field of database design specifically database schema creation via a graphical user interface.

BACKGROUND OF THE INVENTION

Traditional programming done in computer systems needs to store information in some kind of permanent storage. While this can be accomplished on simple text files, the complexities of today's information requires a more structured form of storage. Some of the technologies that have been created to facilitate this task range from XML and JSON formats to full blown relational database management systems and NoSQL databases.

The multiplicity of programming languages and their respective complexity coupled with the complexity of permanent storage systems have given rise to specialization where management of storage systems and programming have to be done by different individuals. Some efforts have been made with the WYSIWYG (What You See Is What You Get) editors have enabled the automatic generation of programming code related to forms and to hide the complexity of systems programming for the most common tasks. The versatility of these systems even allow the user to connect the forms to already existing databases. Unfortunately, the number of state of the art systems that utilizes WYSIWYG editor to generate forms that connect to databases and also integrate schema generation is extremely limited.

DESCRIPTION OF PRIOR ART AND SHORTCOMINGS OF THE PRIOR ART

What can be considered the best representation of the current state of the art in WYSIWYG that fuses both the code generation and database integration that includes schema generation is U.S. Pat. No. 8,683,315 B2. While this state of the art representative includes database schema generation, it is severely limited and is only useful under extremely restrictive instances. The invention allows the creation and modification of a database schema.

The schema generation on the U.S. Pat. No. 8,683,315 B2 follows from the schema generation interface where "the user desires to use a preexisting schema for a common type of form . . . then the user selects a schema suggested by the system based on the form input elements included on the form interface". In addition the system may "scan the form elements and determine that the user has a high probability of implementing a guest book, for example, in which case a schema or list of guest book Schemas is presented to the user for selection". Alternatively, "the system may present code generation interface at any point in the process and the user may, for example, edit the generated schema and/or SQL file"

The embodiments described above by this representative of the state of the art is reliant on predefined templates to be matched and does not provide a true SQL schema generation which may contain form fields outside of those provided by the templates. The patent representative also is mute on how the application generates those templates. Based on the information provided, someone skilled in the art will likely come to the conclusion that it needs a database programmer to pre-design the templates. This defeats the purpose of automatic generation and truly automated system behavior by shifting the problem to pre-design by a person with database knowledge.

Truly automated systems in schema generation presents some real challenges that are non-obvious and difficult to solve. The first is to enable a system to generate the schema by gathering information that must be inferred from user generated fields. This is a challenge since a field could be well written as "name", "last name" or alternatively can be written as "a1", "a2" respectively. The second challenge is even if the fields are properly labeled in a form, the relationships may not be evident such as "name" "name of spouse" and "sex". The last example may refer to the sex of the person filling the form field name.

The state of the art representative is limited to relational databases and does not cover other forms of database such as semi structured document databases such as XML databases and other databases such as NOSQL databases.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

The present invention overcomes the limitations of the Prior art in the generation of the database schema when using a WYSIWYG to construct forms.

Therefore, in one aspect, the invention is about providing a system that generates the database schema from information gathered by inferences from user generated fields on the WYSIWYG.

In another aspect, the invention aims to allow the system to guide the user through its WYSIWYG interface to properly label form fields that can be used to infer information as to the relationship between fields on the form. This information can then be leveraged by the system during the process of database normalization or storage optimization on semi structured documents such as XML or JSON.

In yet another aspect, the invention aims to allow the system to gather information on how multiple forms interact with one another in a transactional flow that consists of multiple forms and decisions among the forms shown to the user based on the fields that are filled by the user.

In one aspect, the invention is about a system for database schema creation through analysis of a transactional workflow on a graphical user interface, said system comprising: at least one processor, at least one memory module, at least one database, at least one sensor, at least one signal processing module for one or more said sensors, an application interface that provides a graphical representation of said transactional workflow, wherein said application interface contains a canvas graphical representation where one or more specific functionality icons are placed on said canvas, with each said icon representing a configuration interface that is interlinked by one or more program execution links, wherein said canvas is divided into columns and rows representing a respective grid location execution slot identified by the grid location where said slot is placed in said canvas, and where said icons representing a configuration interface of a data operation or information acquisition from one said sensor are interlinked by one or more of said program execution links across said grid locations on said canvas and wherein said transaction workflow is analyzed to insert data on the tables for each of the operators in the workflow within said database as a function of said program execution links. In another aspect said transactional workflow is analyzed to determine whether each said specific functionality icon placed within a grid location execution slot on said canvas has a dependency across grid locations and the database tables are created if they are not dependent. In yet another aspect said transactional workflow is analyzed to determine whether each said specific functionality icon placed within a grid location execution slot on said canvas has a dependency across grid locations and the data tables within said databases are created with the appropriate dependency as well as any applicable foreign key columns. In another aspect said transaction workflow is analyzed to determine whether each said specific functionality icon placed within a grid location execution slot on said canvas has a row codependency from a previously created operator along said column and said analysis creates the database tables with the operator attributes and corresponding private key column from a previously created table if the operator is found to be dependent on the database table created for the previous row operator. In yet another aspect, said transaction workflow is analyzed to determine whether each said specific functionality icon placed within an execution slot on said canvas has a columnar codependency from a previously created operator along said column and said analysis merges the database tables with the operator attributes and corresponding—from a previously created database table if the operator is found to be dependent on the previous operator.

In one aspect the invention is about a system for information storage in a database through analysis of a transactional workflow on a graphical user interface, said system comprising: at least one processor, at least one memory module, at least one database, at least one sensor, at least one signal processing module for one or more said sensors, an application interface that provides a graphical representation of said transactional workflow, wherein said application interface contains a canvas graphical representation where one or more specific functionality icons are placed on said canvas, with each said icon representing a configuration interface that is interlinked by one or more program execution links, wherein said canvas is divided into columns and rows representing a respective grid location execution slot identified by the grid location where said slot is placed in said canvas, and where said icons representing a configuration interface of a data operation or information acquisition from one said sensor are interlinked by one or more of said program execution links across said grid locations on said canvas, wherein said transaction workflow is analyzed to insert data on the tables for each of the operators in the workflow within said database as a function of said program execution links based on a dependency of the triggers given in said configuration and links, wherein said transactional workflow is analyzed to determine whether each said specific functionality icon placed within a grid location execution slot on said canvas has a predecessor operator and a foreign key attribute is added to the workflow table column based on said dependency of the triggers given in said configuration and links of the grid location where any said condition is found. In another aspect said transactional workflow is analyzed to determine whether each said specific functionality icon placed within a grid location execution slot on said canvas has a dependency across grid locations and the data is inserted on the database tables if there are no said dependencies. In yet another aspect, said transaction workflow is analyzed to determine whether each said specific functionality icon placed within a grid location execution slot on said canvas has a row codependency of from a previously created operator along said column and said analysis inserts the data on the database tables with the operator attributes and a corresponding foreign key column from a previously created table if the operator is found to be dependent on the database table created for the previous row operator. In another aspect said transactional workflow is analyzed to determine whether each said specific functionality icon placed within a grid location execution slot on said canvas has a dependency across grid locations and the data is inserted into the data tables within said databases with the appropriate dependency as well as any applicable foreign key columns. In yet another aspect, said transaction workflow is analyzed to determine whether each said specific functionality icon placed within an execution slot on said canvas has a columnar codependency from a previously created operator along said column and said analysis inserts the data on the database tables with the operator attributes and corresponding foreign key column from a previously created workflow table operation if the operator is found to be dependent on the database table created for the previous operator.

In one aspect the invention is about a method for database schema creation through analysis of a transactional workflow on a graphical user interface, said method comprising: using at least one processor, using at least one memory module;

accessing at least one database, using at least one sensor, using at least one signal processing module for one or more said sensors, providing an application interface that provides a graphical representation of said transactional workflow, wherein said application interface contains a canvas graphical representation where one or more specific functionality icons are placed on said canvas, with each said icon representing a configuration interface that is interlinked by one or more program execution links, wherein said canvas is divided into columns and rows representing a respective grid location execution slot identified by the grid location where said slot is placed in said canvas, and where said icons representing a configuration interface of a data operation or information acquisition from one said sensor are interlinked by one or more of said program execution links across said grid locations on said canvas and wherein said transaction workflow is analyzed to insert data on the tables for each of the operators in the workflow within said database as a function of said program execution links.

In one aspect the invention is about a method for information storage in a database through analysis of a transactional workflow on a graphical user interface, said method comprising: using at least one processor, using at least one memory module, accessing at least one database, using at least one sensor, using at least one signal processing module for one or more said sensors, providing an application interface that provides a graphical representation of said transactional workflow, wherein said application interface contains a canvas graphical representation where one or more specific functionality icons are placed on said canvas, with each said icon representing a configuration interface that is interlinked by one or more—program execution links, wherein said canvas is divided into columns and rows representing a respective grid location execution slot identified by the grid location where said slot is placed in said canvas, and where said icons representing a configuration interface of a data operation or information acquisition from one said sensor are interlinked by one or more of said program execution links across said grid locations on said canvas, wherein said transaction workflow is analyzed to insert data on the tables for each of the operators in the workflow within said database as a function of said program execution links based on a dependency of the triggers given in said configuration and links, wherein said transactional workflow is analyzed to determine whether each said specific functionality icon placed within a grid location execution slot on said canvas has a predecessor operator and a foreign key attribute is added to the workflow table column based on said dependency of the triggers given in said configuration and links of the grid location where any said condition is found.

In one aspect the invention is about a non-transitory computer-readable medium embodying a program executable by at least one computing device, the program when executed causing said at least one computing device to do the following: using at least one processor, using at least one memory module, accessing at least one database, using at least one sensor, using at least one signal processing module for one or more said sensors, providing an application interface that provides a graphical representation of said transactional workflow, wherein said application interface contains a canvas graphical representation where one or more specific functionality icons are placed on said canvas, with each said icon representing a configuration interface that is interlinked by one or more—program execution links, wherein said canvas is divided into columns and rows representing a respective grid location execution slot identified by the grid location where said slot is placed in said canvas, and where said icons representing a configuration interface of a data operation or information acquisition from one said sensor are interlinked by one or more of said program execution links across said grid locations on said canvas and wherein said transaction workflow is analyzed to insert data on the tables for each of the operators in the workflow within said database as a function of said program execution links.

In one aspect the invention is about a method for information storage in a database through analysis of a transactional workflow on a graphical user interface, said method comprising: using at least one processor, using at least one memory module, accessing at least one database, using at least one sensor, using at least one signal processing module for one or more said sensors, providing an application interface that provides a graphical representation of said transactional workflow, wherein said application interface contains a canvas graphical representation where one or more specific functionality icons are placed on said canvas, with each said icon representing a configuration interface that is interlinked by one or more—program execution links, wherein said canvas is divided into columns and rows representing a respective grid location execution slot identified by the grid location where said slot is placed in said canvas, and where said icons representing a configuration interface of a data operation or information acquisition from one said sensor are interlinked by one or more of said program execution links across said grid locations on said canvas, wherein said transaction workflow is analyzed to insert data on the tables for each of the operators in the workflow within said database as a function of said program execution links based on a dependency of the triggers given in said configuration and links, wherein said transactional workflow is analyzed to determine whether each said specific functionality icon placed within a grid location execution slot on said canvas has a predecessor operator and a foreign key attribute is added to the workflow table column based on said dependency of the triggers given in said configuration and links of the grid location where any said condition is found.

Other features and advantages of the present invention will become apparent upon examining the following detailed description of an embodiment thereof, taken in conjunction with the attached drawings, which are provided for purposes of illustration and not of limitation.

Figure 1:
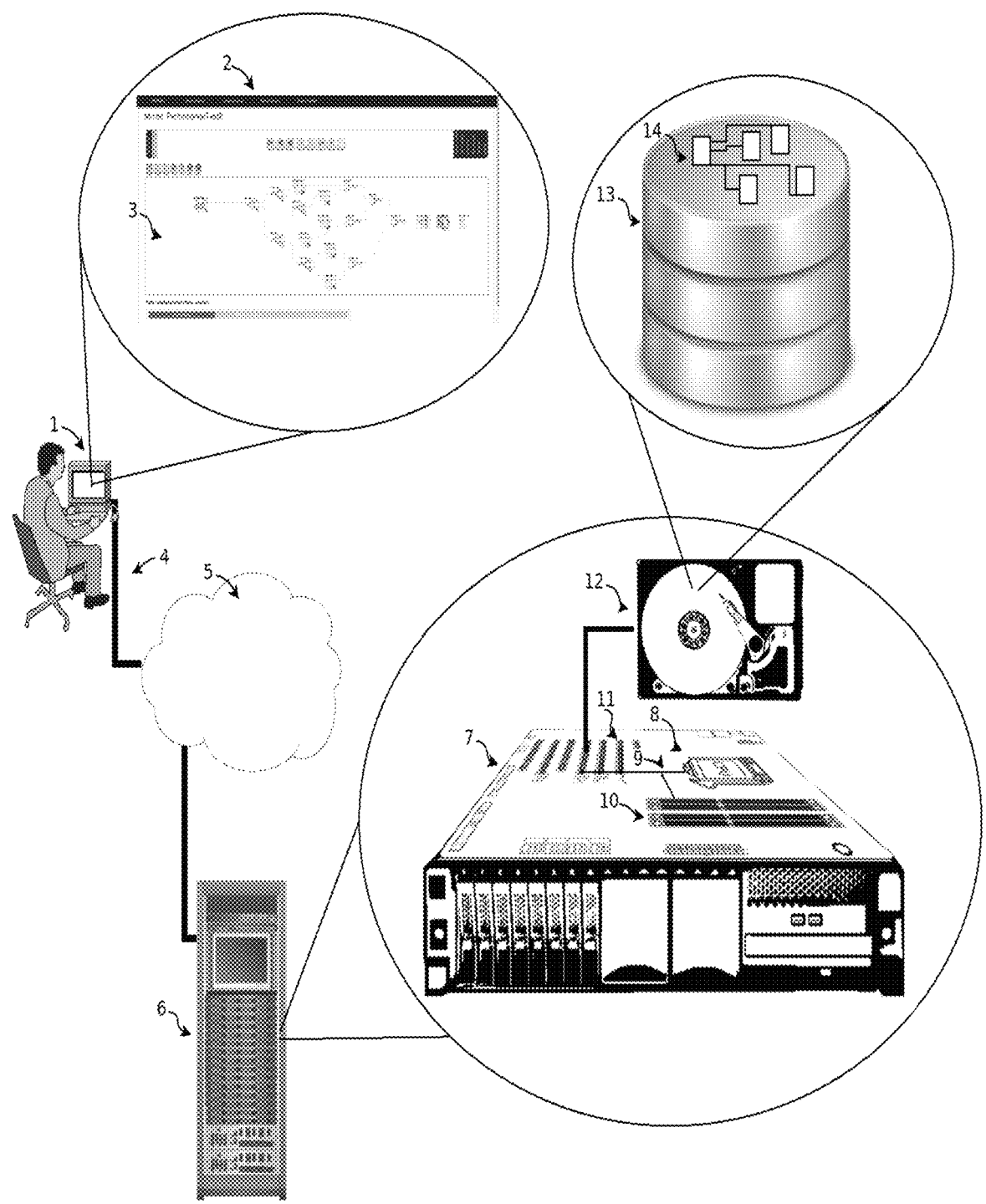
FIG. 1 presents a depiction of the overall system, according to an exemplary embodiment of the invention.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

Those with skill in the computing arts will recognize that the disclosed embodiments have relevance to the automatic creation of a database schema. Such creation can have a meaningful impact on the amount of hardware necessary to execute the database in an efficient manner. Especially, the efficient implementation depends on the need to conserve disk space and the amount of virtual memory, caching and Random access memory required. This is also crucial if the conceived embodiments are not just implemented on high end expensive system but embedded systems and other relevant computing architectures. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

FIG. 1 presents a depiction of the overall system of an embodiment of the proposed system where a person utilizes a computer system 1 to interact with an application interface 2. The application interface 2 may completely or partially reside on the computer system 1. The application interface 2 provides a graphical representation of a flow 3. Once the user finishes configuring the graphical representation of flow 3, the user can communicate through a communications line 4 to a remote location 5 that is a site that houses a server system 6. The communications line 4 is typically embodied to operate in a networked environment using logical connections to one or more remote computers, such as a remote server system 6.

An alternate embodiment may forego the remote location in favor of being located locally close to the user in the same facility. The communications line 4 include a local area network (LAN) and a wide area network (WAN), but may also include other networks. Such networking environments are commonplace in offices, enterprise-wide computer networks, intranets and the Internet and is well known to those skilled in the arts. For example, in the subject matter of the present application, the computer system 1 may comprise the source machine from which data is being migrated, and the remote server system 6 may comprise the destination machine.

Note however that source and destination machines need not be connected by a network or any other means, but instead, data may be migrated via any media capable of being written by the source platform and read by the destination platform or platforms. When used in a LAN or WLAN networking environment, the computer 1 is connected to the LAN through a network interface or adapter. When used in a WAN networking environment, the computer 1 typically includes a modem or other means for establishing communications over the WAN, such as the Internet. The modem, which may be internal or external, may be connected to the system bus via the user input interface or other appropriate mechanism. In a networked environment, program modules depicted relative to the computer 1, or portions thereof, may be stored in the remote memory storage device. By way of example, remote application programs may reside on memory device. It will be appreciated that the network connections shown are exemplary and other means of establishing a communications link between the computers may be used.

The server system 6 in its typical embodiment is made up of a server 7 or a plurality of them. The server system 7 typically consists of a CPU system 8 that connects to a bus 9. The bus 9 also connects to memory modules 10 and I/O device connector 11. I/o connector 11 connects to a storage disk 12. Such representation of storage disk 12 can have an alternate embodiment such as solid state device, GPU RAM, optical disk or other storage facility.

Figure 2:
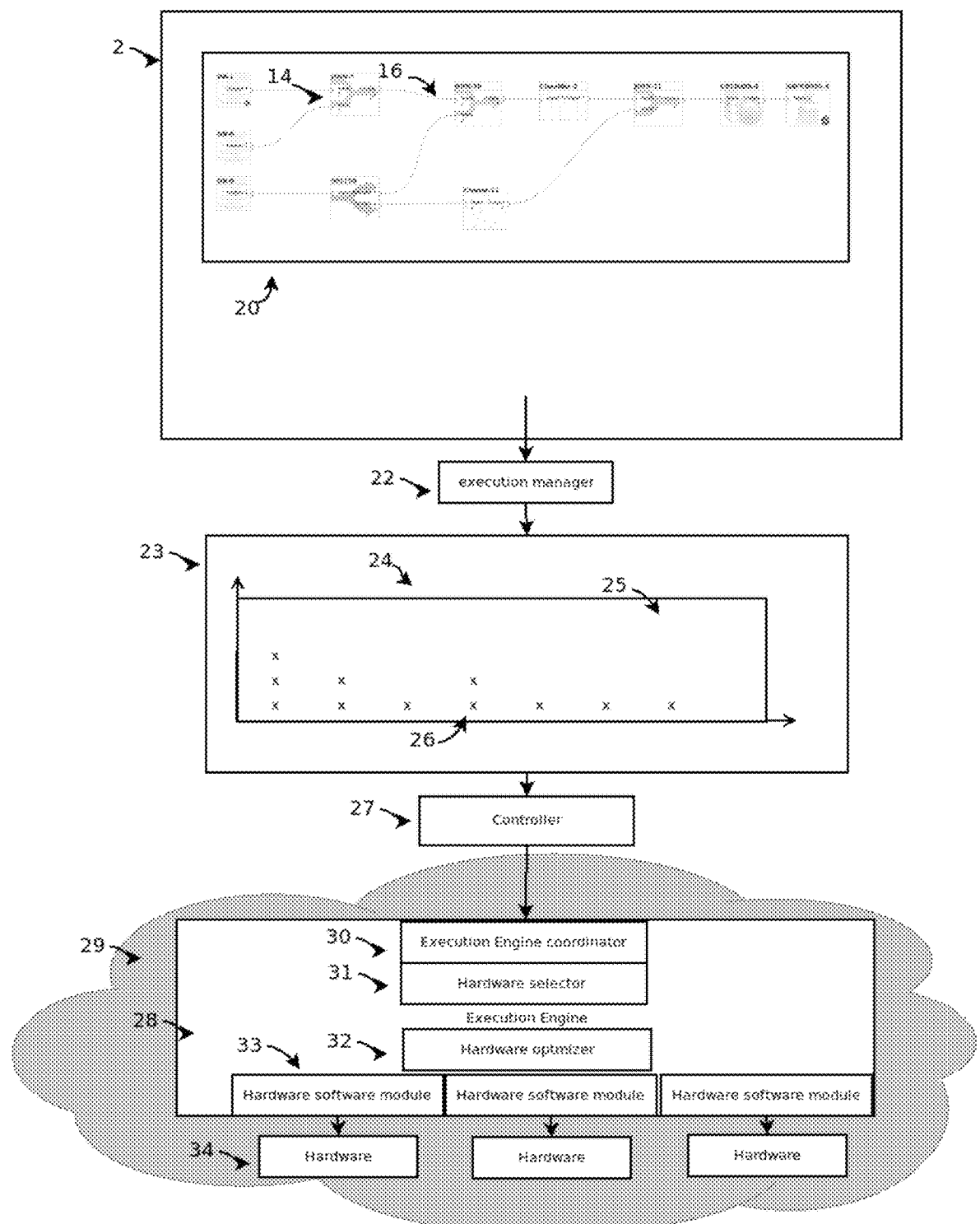
FIG. 2 Displays a representation of the major components of the proposed system that will process a generic deigned flow including the proposed database schema generation, according to an exemplary embodiment of the invention.

FIG. 2 Displays a graphical representation of the major components of the proposed system that will process a generic deigned flow including the proposed database schema generation. The system starts with the interface system 2 that has a functionality icons 14 that have the configuration that the system will execute and are connected via a link 16 together to form an execution program 20. Once the execution program 20 is finished in its design the program will be forwarded to an execution manager 22. The execution manager 22 will reside on the remote server system 6. The execution manager 22 will produce an execution map 23 based on the execution program 20. The execution map 23 contains an execution matrix 24 that will store the order of the execution for the execution program 20. Each entry in the execution matrix 24 is assigned an execution slot 25 that can be filled with an execution entry 26 that corresponds to functionality icon 14.

Once the execution map 23 is completed it is passed to a controller 27 that also resides on server remote system 6. The controller coordinates the execution with an execution engine 28 across the cloud environment 29. Cloud environment 29 is composed of cloud infrastructure 19 that contains up to n remote server system 6. The controller 27 communicates to an execution engine coordinator 30 that resides on one of n remote server system 6 of cloud environment 29. The execution engine coordinator 30 uses a hardware selector 31 to discriminate which component of remote server system 6. For example, hardware selector 31 can choose between execution hardware including but not limited to CPU, GPU, multithreading or other processing technology and hard drive, optical media or other storage medium.

Once hardware selector 31 chooses the particular processing technology, the hardware selector 31 selects a hardware optimizer 32 which coordinates with a hardware software module 33 that contains the necessary routines to interact with an hardware 34. An alternate embodiment might also include a non-cloud environment where all components run on a single system and includes the specified components to run on a single system. Such alternate embodiment can easily be conceived by someone skilled in the art from the already disclosed description.

Figure 3:
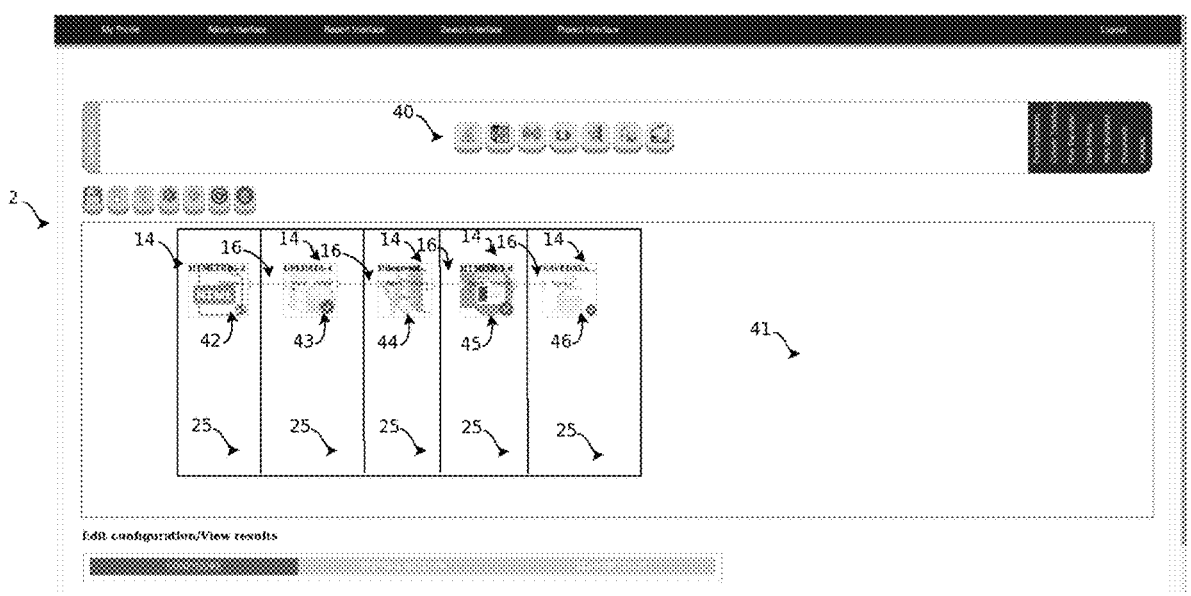
FIG. 3 displays the application interface with specific functionality icon and links that form the schema creation in an execution program,, according to an exemplary embodiment of the invention.

FIG. 3 displays the application interface 2 with specific functionality icon 14 and link 16 together to form the schema creation in an execution program 20. Each of the icon 14 represents a configuration interface that are interlinked together via link 16. The application interface 2 takes the configuration from each interface represented via the plurality of icon 14 and converts it into an executing program. This program is passed then to execution manager 22 to execute the program in remote server system 6. The figure shows a plurality of icon 14 that are placed in their respective execution slot 25 depicted by the black lines surrounding each functionality icon 14. The application interface 2 contains icons button 40 that can then be placed on a canvas 41 and in this way become functionality icon 14 and be connected by link 16.

The plurality of icons 14 in their respective execution slot 25 that together constitute a transaction template in a graphical form start out with an icon 42 which is an initiator in the desired execution order. The icon 42 is the icon responsible in bringing the configuration menu for the initial form and the database creation. Additionally the icon 42 is the entry point of a user transaction. An icon 43 placed after icon 42 receives the information from the created database and can map the information submitted from the form created and insert it into the database. After icon 43 comes icon 44 that extracts information from the database and shows the results to the user through icon 45. The graphical representation of the transaction template ends when the icon 45 gives way to a transaction terminator icon 46 which signal the application to end.

Figure 4:
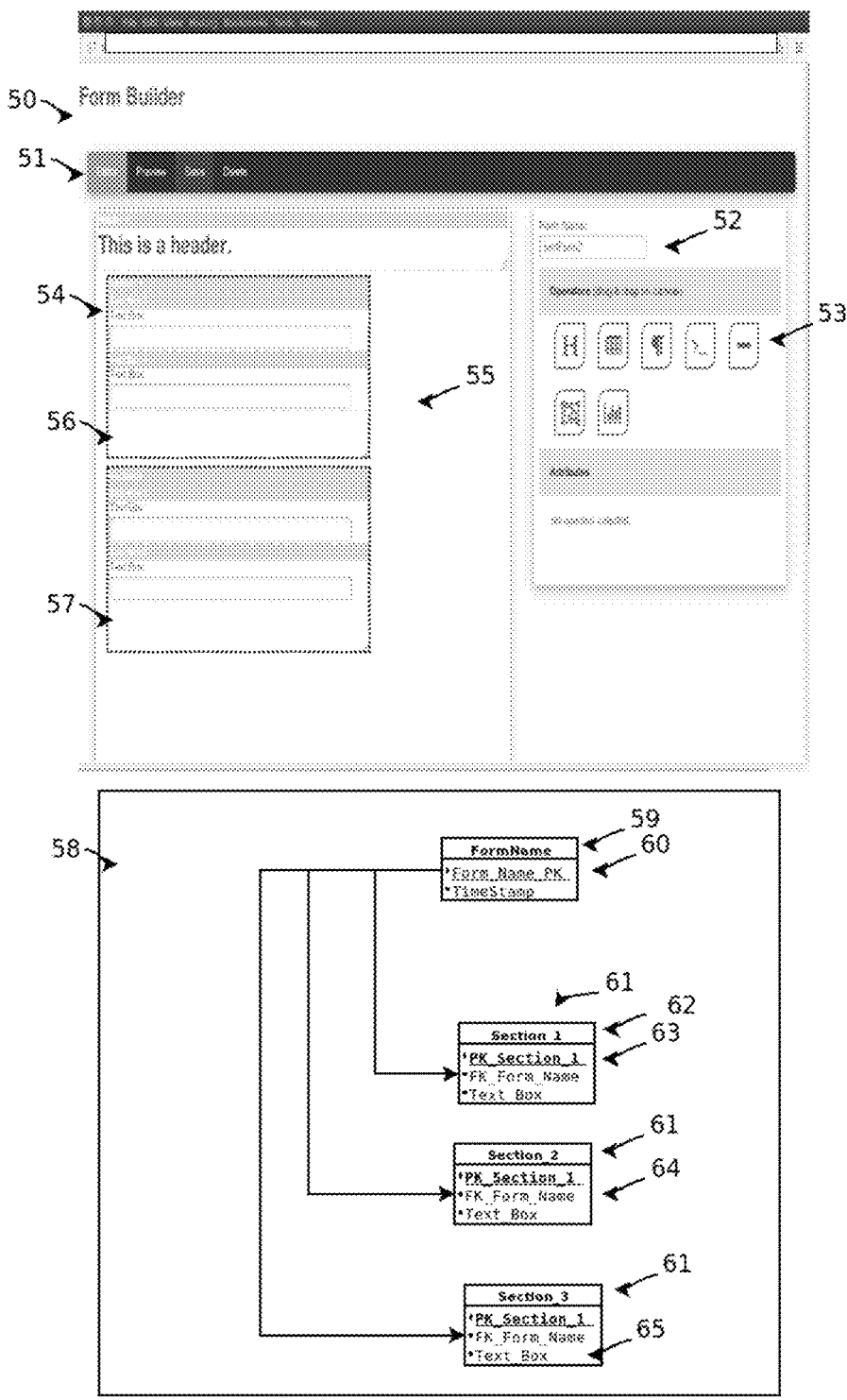
FIG. 4 presents the form interface where the user configures the form fields and the respective positioning within the form, according to an exemplary embodiment of the invention.

FIG. 4 presents the form interface where the user configures the form fields and the respective positioning within the form. The form interface 50 is presented to the user when he clicks on the icon 42 of the application interface 2. The form interface 50 has a top menu 51 that allows the user to have an editor mode a preview of the final design a save functionality and delete functionality. The form interface 50 also has a form name field where the user identifies the name of the form. The form interface 50 further contains a form name 52 and an icon buttons 53 that are form elements such as a text field 54 that can be dragged and dropped into a canvas 55. Fields such as text field 54 are accepted on the canvas 55 as long as they fall into a section 56. additional sections can be added besides section 56 such as a section 57 and other sections as deemed relevant by either application defaults or user addition.

From the interface a database can be generated such that the form name extracted from form name 52 and placed in a database schema 58 as a main database table or simply table name 59. The main table 59 contains relevant columns such as the form name primary key 60. Other column elements that can be part of the embodiment are but not limited to timestamp, form metadata, section metadata, among others. A table 61 can be created based on a respective section 56. Table 61 can then be identified by giving a table name 62 based on section 56. A Primary key 63 identifies each entry on table 61 and is a required column to identify each entry made through the form represented in canvas 55.

The table 61 also needs to include a foreign key 64 that maintains the relationship with main table 59 and the other tables in the database for each entry. The table 61 also includes data field 65 which inserts the information entered on the input area such as text field 54 by the user via form represented by canvas 55. The data entry is not limited to text field 54 but any additional data entry representation given by the operations supplied by icon buttons 53

Figure 5:
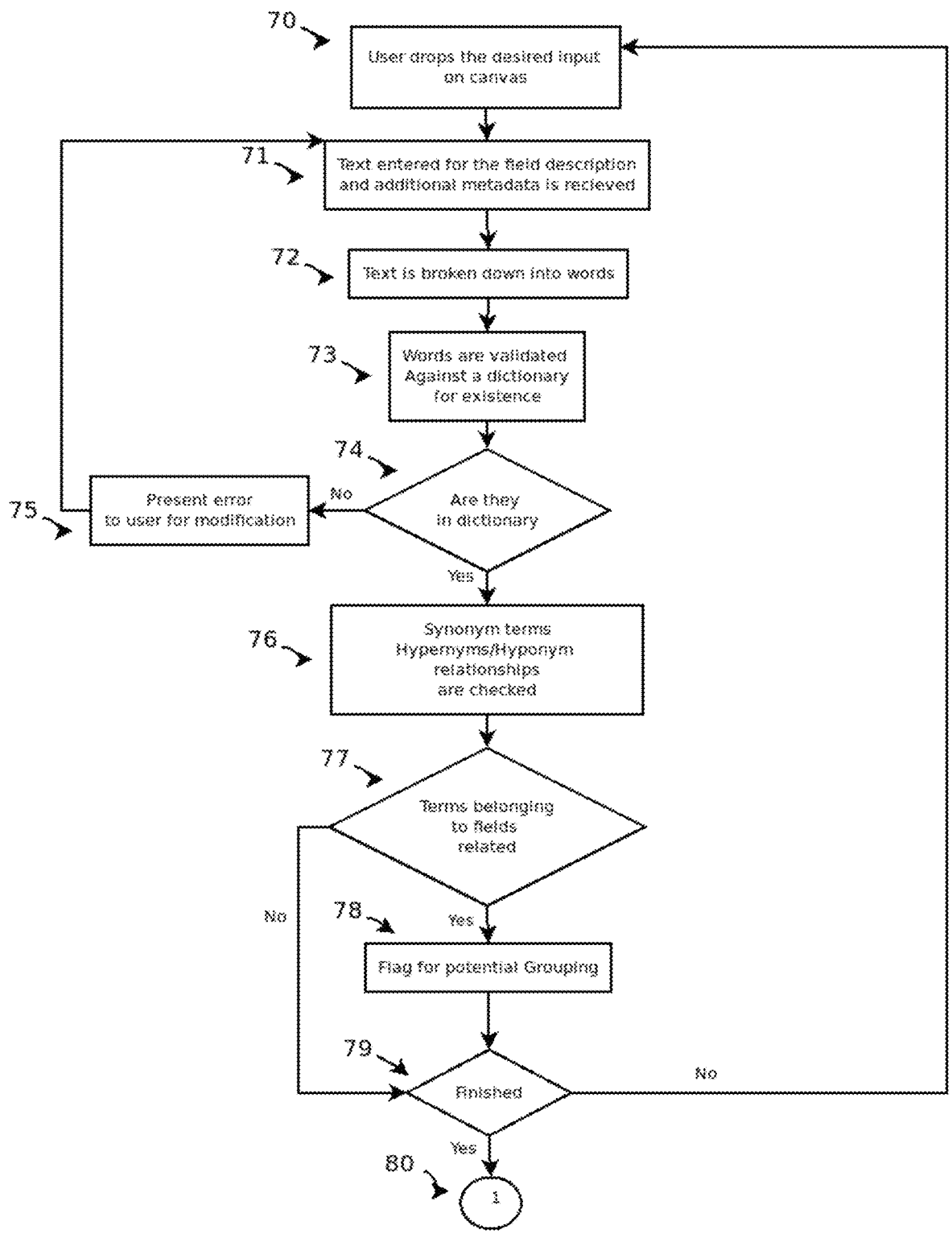
FIG. 5 presents a flowchart of the field information validation process, according to an exemplary embodiment of the invention.

FIG. 5 presents a flowchart of the field information validation process. The figure start with a step 70 where the user drag and drops icon buttons 53 with the desired input field representation on canvas 55. When the user drops the desired input field on step 70 a step 71 is triggered where the relevant information fields are shown to the user to enter the name for the field and additional space for metadata. Said name and metadata are used to identify the field on canvas 55. The text supplied in step 71 is broken down into individual words in a step 72. The individual words obtained in step 72 are validated in a step 73 with a dictionary to see if they are acceptable words in the language.

Additional validation steps can be carried out in an alternate embodiment before step 73 such as minimum length of 4 characters such as to avoid words such as 'is', 'but', 'the' among other words with minimal descriptive use. The step 73 is followed by a decisional step 74 that instructs the process on negative results to go to a step 75 where the user is presented with a notification. The notification informs the user that the terms are not in the dictionary and the step 75 guides the user to enter additional text or modify the entry in step 71. If step 74 positively asserts that words are in the dictionary a step 76 is executed where the entries are searched for synonyms, hypernym/hyponym relationship among the terms.

The embodiment is not limited to just synonyms, hypernym/hyponym but includes additional relationships such as antonyms, sense disambiguation among other lexical and even semantic relationships such as semantic role labeling for metadata and fields. The relationships found in step 76 are used in a decisional step 77 where the words corresponding to different fields are compared for their respective relationships among each other. If decisional step 77 is positive, a grouping step 78 is implemented where fields having relationships among them are grouped together. Step 77 answered in the negative and the step 78 lead to a decisional step 79 that if the user is not finished with the form it leads back to step 70, else it goes to the next steps of the process in a step 80.

Figure 6:
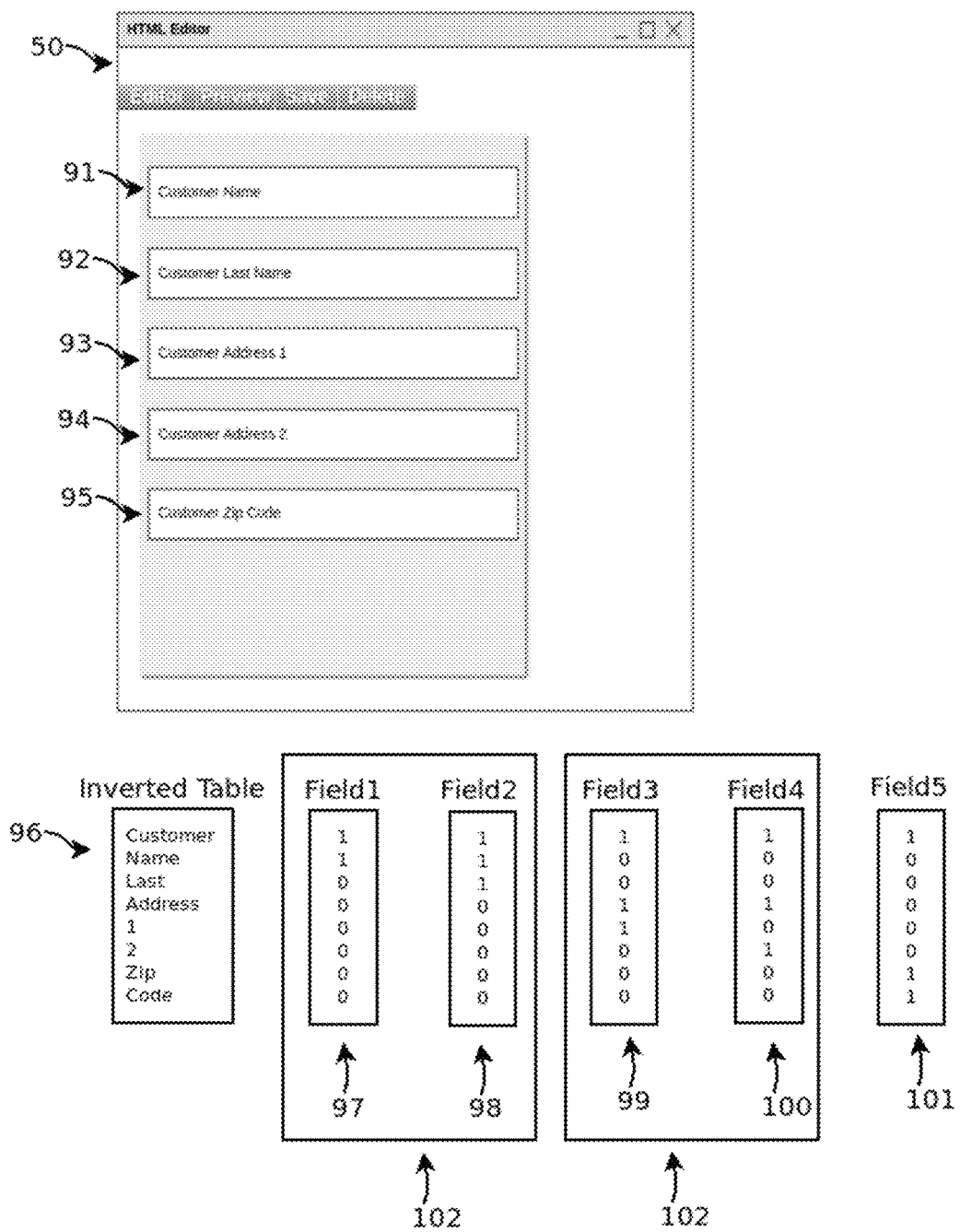
FIG. 6 shows the graphical user interface and a vector space representation, according to an exemplary embodiment of the invention.

FIG. 6 shows the graphical user interface and a vector space representation. FIG. 6 shows an alternate representation of form interface 50. Form 50 shows a field 91 that has been labeled 'customer name'. Form 50 also includes a field 92 labeled 'customer last name', a form field 93 labeled 'customer address1', a field 94 labeled 'customer address 2' and a field 95 labeled 'customer zip code'. All fields labels of form 50 are then parsed into individual words and an inverted index 96 is created. Field 91 is converted into a vector 97, field 92 is converted into a vector 98, field 93 is converted into a vector 99, field 94 is converted into a vector 100 and field 95 is converted into a vector 101. Vectors 97, 98, 99, 100 and 101 are created by checking if the respective entry in the inverted index is part of the label. If the index entry is found in the label then a 1 is inserted else the entry is assigned a value 0 for that vector. The vectors that score close together can be assigned into a group 102

Figure 7:
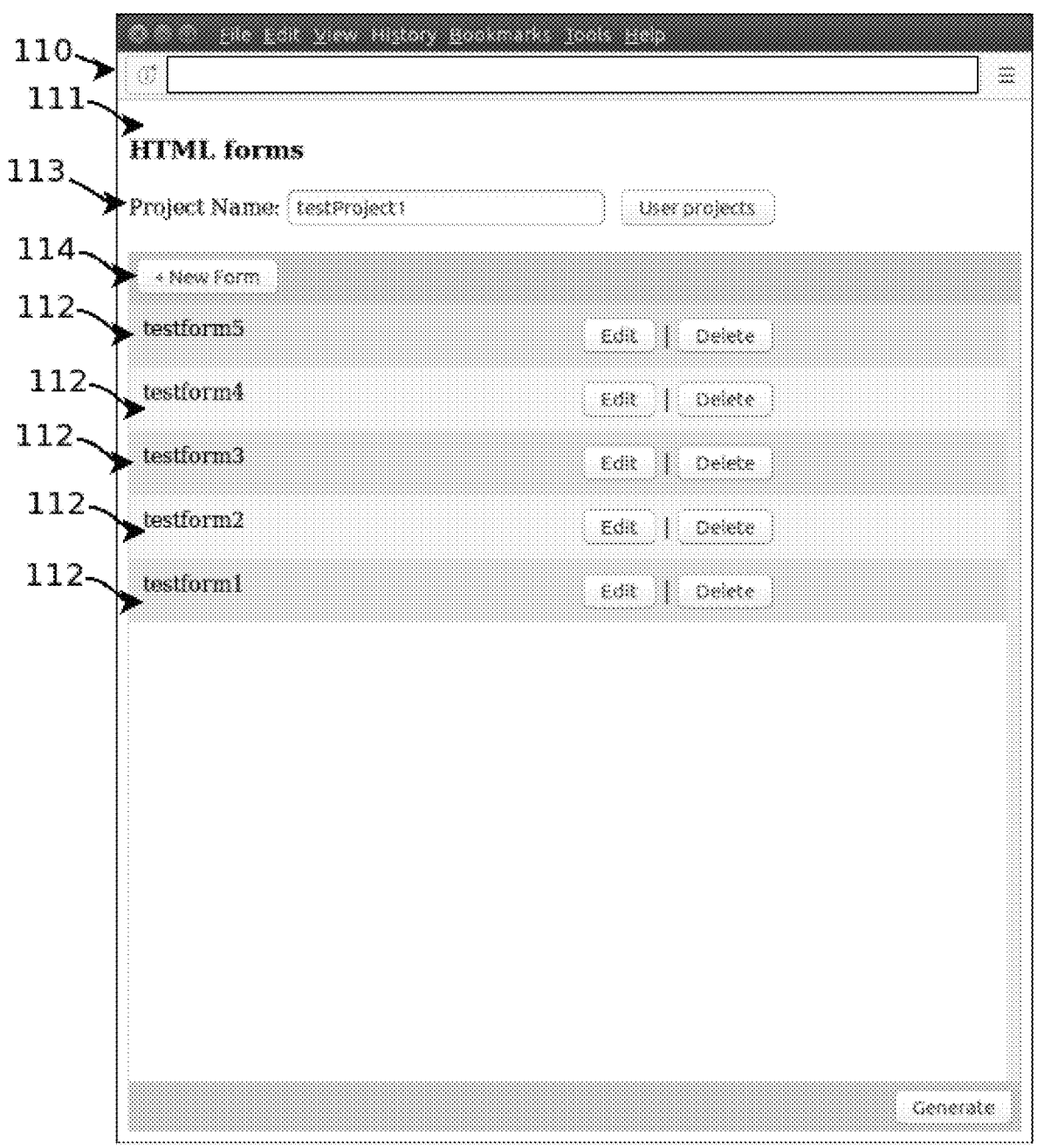
FIG. 7 shows a graphical user interface that displays multiple forms, according to an exemplary embodiment of the invention.

FIG. 7 shows a graphical user interface that displays multiple forms. A graphical user interface 110 displays an interface 111. The interface 111 displays a form 112. several forms 112 can be displayed in the interface as needed to generate a complex data entry process. All instances of form 112 can be brought under a project name 113 and stored in a database under the project name 113 identifier. New forms can be added to the project under project name 113 by using an addition button 114.

Figure 8:
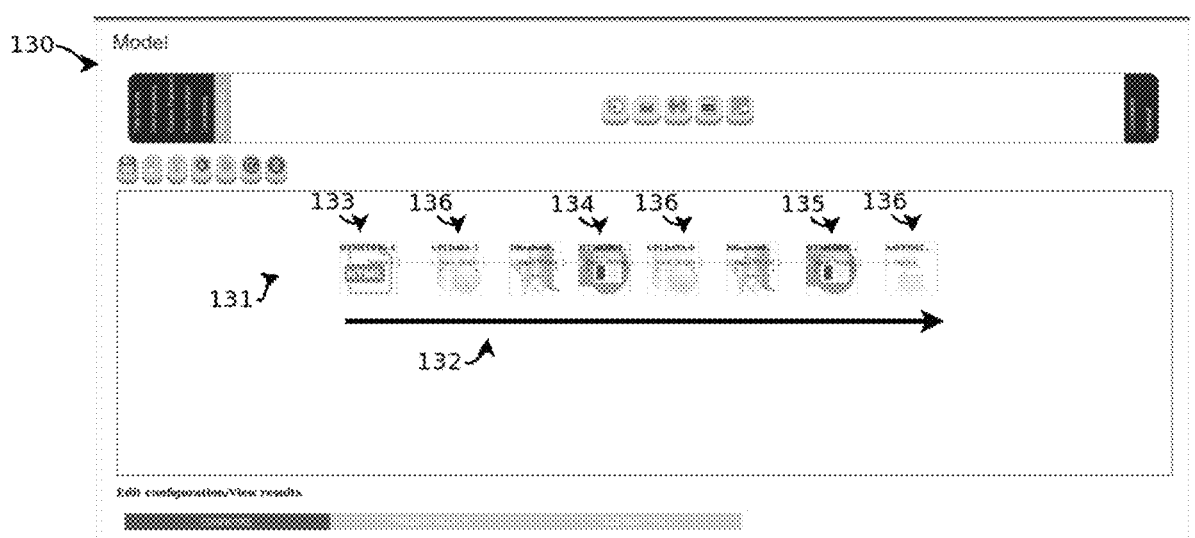
FIG. 8 displays a typical transactional flow with multiple forms, according to an exemplary embodiment of the invention.

FIG. 8 displays a typical transactional flow with multiple forms. A user interface 130 displays a transactional flow 131. The transactional flow direction is represented by an arrow132. The transactional flow has an icon 133, an icon 134 and an icon 135 that represent the insertion on the flow of form interface 50 and its underlying execution functionality of displaying its respective form for input. An icon 136 represents the configuration for directing the system to accept the form information from the forms and insert them into the database. Such decoupling of icon 133, icon 134 and icon 135 that display the form and icon 136 that inserts the database is representative but not limited to architectures such as client server communication in web programming. In such communication architecture, the display is managed independently as client side programming and the functionality that executes the processing of information is managed by the server.

Figure 9:
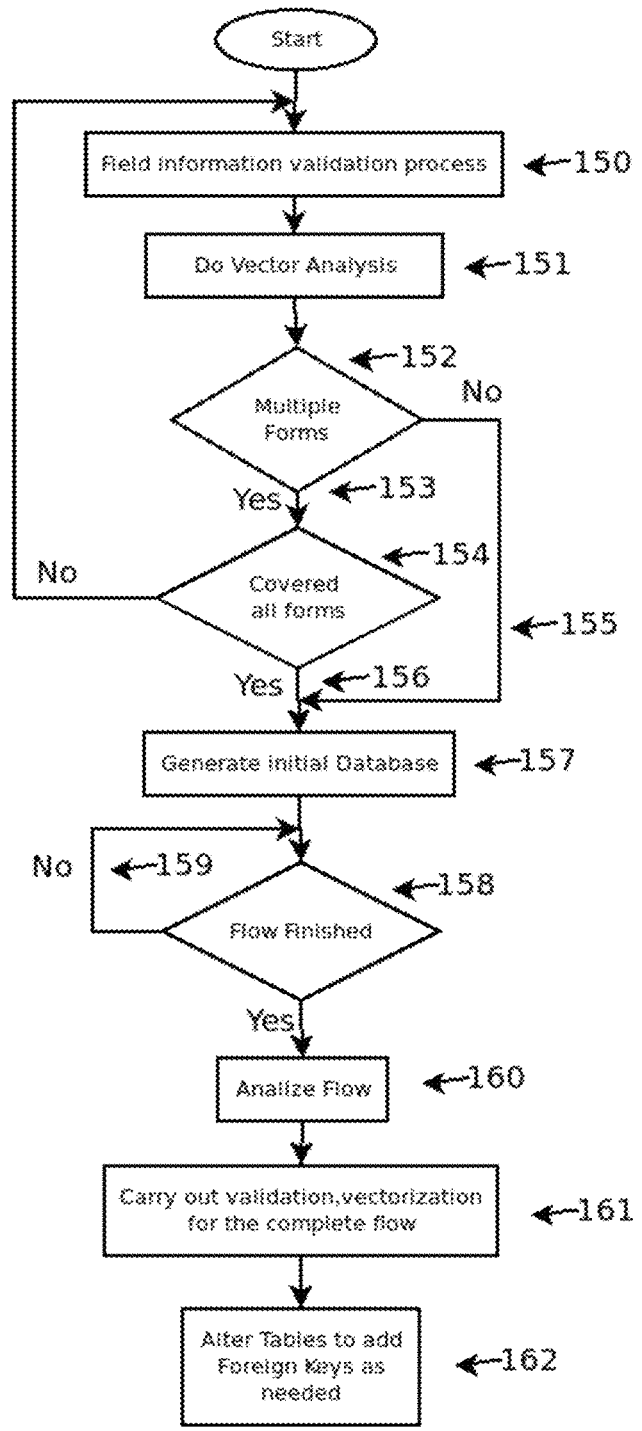
FIG. 9 is a flowchart of the database schema creation process on multiple forms used in a transactional flow, according to an exemplary embodiment of the invention.

FIG. 9 is a flowchart of the database schema creation process on multiple forms used in a transactional flow. The process starts with a single page being received for processing in a step 150 that does the field information validation process described by FIG. 5. A step 151 follows step 150 where the vector analysis of FIG. 6 is carried out. Following step 151 a step 152 verifies if there is more than one form to process in the programming that executes the processing of graphical user interface 110 of FIG. 7.

If validation in step 152 determines that there are multiple forms, then the process will take a path 153 to a stopping criteria in a step 154. If step 154 is negative, then it will return to the beginning of the flow and repeat until all forms are processed. If step 152 is negative it will take a path 155 that will join with a path 156 coming from step 154 that ends in a step 157 that will create the initial database for a single or multiple forms. After generating the initial database in step 157 a step 158 will monitor user interface 130 to determine if the user completed the intended flow and will continue in a loop 159 until the flow on interface 130 is finished.

Once the flow is finished as validated in step 158 a step 160 will analyze the flow and determine the position of the forms within the flow. This analysis will assign a high probability that forms in the beginning of the flow will generate primary keys which will act as foreign keys in subsequent forms if they are connected in a path dependent fashion. A step 161 following step 160 will carry out the grouping through vectorization and validation through the multiple forms that are present in the form. Based on the analysis of step 160 and step 161 a step 162 will re organize the tables by altering their structure or adding foreign keys to reflect the new relationships. These new relationship changes can embody doing normalization based on matching similar fields, adding foreign keys to subsequent forms and grouping sections or separating them based on vectorization and synonyms, hypernym/hyponym relationships. This embodiment is not limited only to relational databases but can be utilized in other database types such as XML databases or similar databases.

Figure 10:
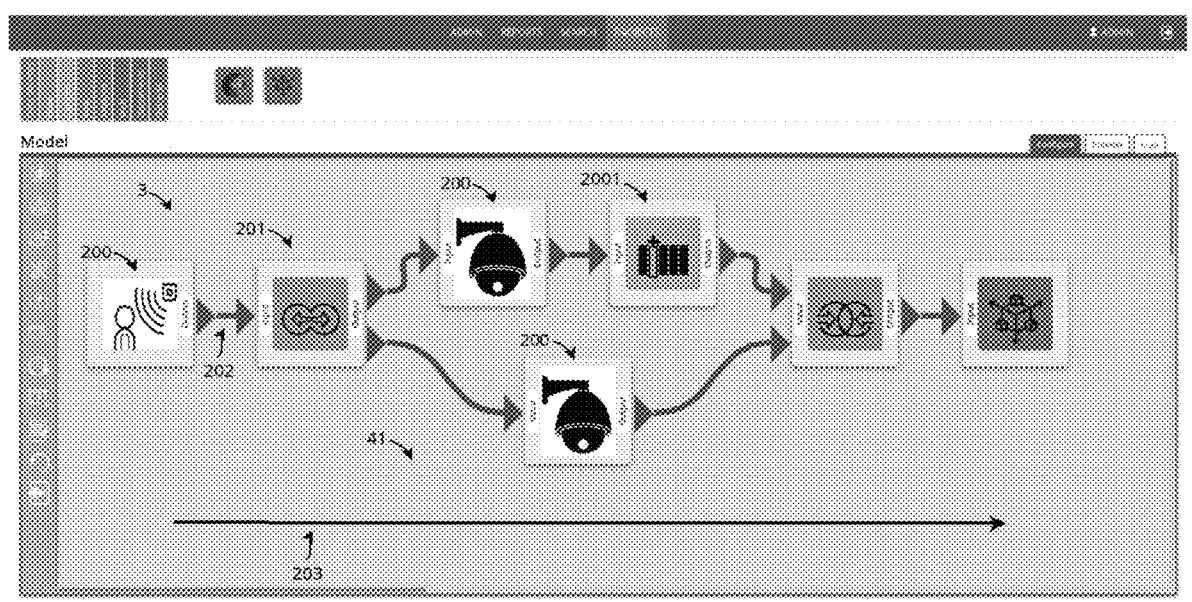
FIG. 10 displays the application interface with functionality icons that represent both physical workflow and non-physical processing workflows alongside the links that form the paths that are used for schema creation and execution program of the program, according to an exemplary embodiment of the invention.

FIG. 10 displays the application interface with functionality icons that represent both physical workflow and non-physical processing workflows alongside the links that form the paths that are used for schema creation and execution program of the program. The graphical representation of flow 3 has in canvas 41 a physical operator 200 and a non-physical processing icon 201. The physical operator 200 and non-physical processing icon 201 can be used together in a single workflow as represented in the graphical representation of flow 3. the physical operator 200 and a non-physical processing icon 201 are joined by edges 202. the edges 202 point in the direction of the workflow as represented by an arrow 203.

Figure 11:
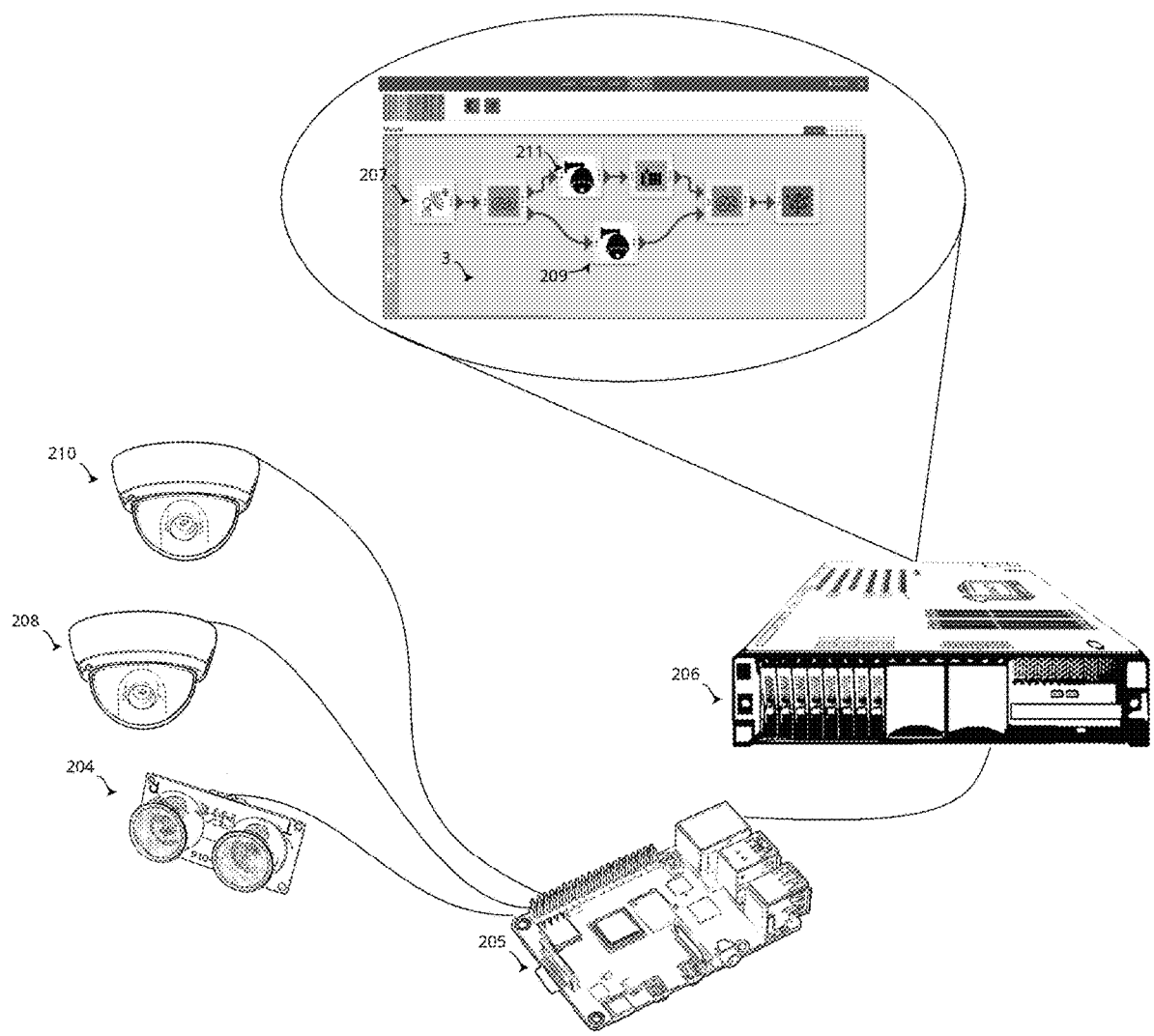
FIG. 11 shows a diagram of the physical devices connected to the computerized system that processes the workflow, according to an exemplary embodiment of the invention.

FIG. 11 shows a diagram of the physical devices connected to the computerized system that processes the workflow. A physical sensor 204 corresponds to an ultrasound sensor that is connected to one or more signal processing modules, such as a microcontroller 205. The microcontroller 205 in turn is connected to a server 206. The server 206 contains the program that processes the graphical representation of flow 3. Within the graphical representation of flow 3 there is a physical operator 207 that corresponds to the graphical representation of the physical sensor 204. A different physical sensor 208 may be a camera that is also connected to a signal processing module within a microcontroller 205 that provides the information to server 206 that has the graphical representation of flow 3 where there is a physical operator 209 that corresponds to the graphical representation of the physical sensor 208. The figure also shows a sensor 210 that is a camera connected to microcontroller 205 that is connected in turn with server 206 that has the graphical representation of flow 3 where there is a physical operator 211 representing the physical sensor 210. The embodiment presented here can also be realized by connecting the physical sensors directly to the server 206 and the server has the required processing elements.

A typical embodiment of the physical device that is represented via a physical operator such as physical operator 207,209, and 211 within the graphical representation of flow 3 can be sensors such as ultrasound, gyroscopic, gas, temperature, motion, humidity, camera, microphones or any other electronic device used for sensing the sensors surrounding area. In addition the physical device that is represented via a physical operator within the graphical representation of flow 3 can also represent output devices such as monitor screens, speakers, motors or any other device that translates a computerized command into a physical output.

Figure 12:
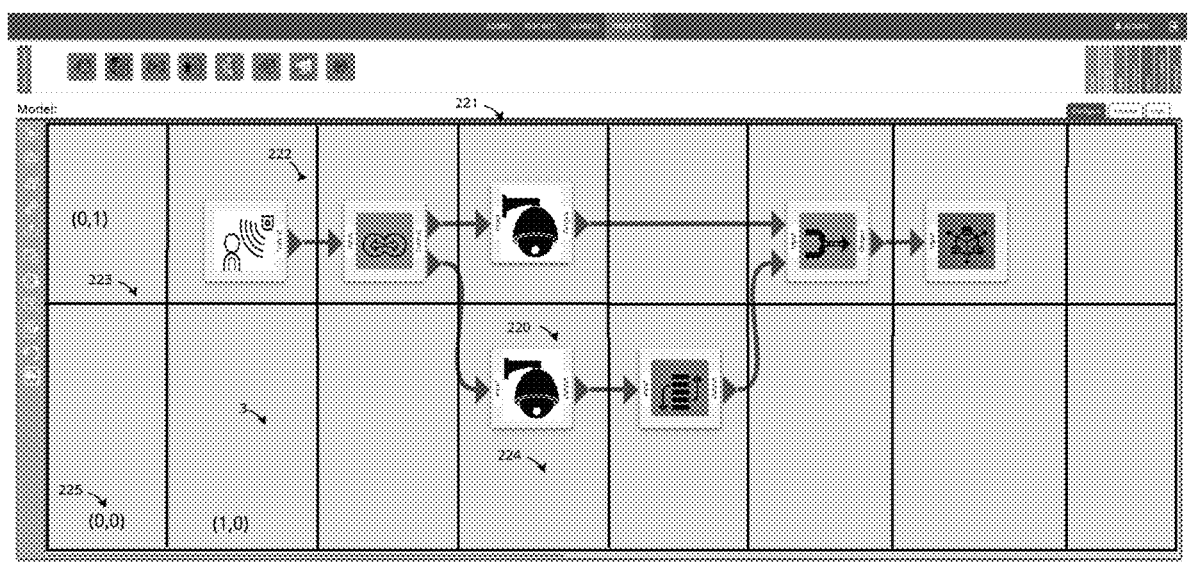
FIG. 12 shows the workflow divided by a grid system, according to an exemplary embodiment of the invention.

FIG. 12 shows the workflow divided by a grid system. The operators 220 within the graphical representation of flow 3 are separated by a grid system 221. The grid system 221 is composed of a vertical line 222 and a horizontal line 223. Each operator 220 can be identified by a grid location 224 within the grid system. The grid location 224 can be specified by an offset 225 specified within the grid system.

Figure 13:
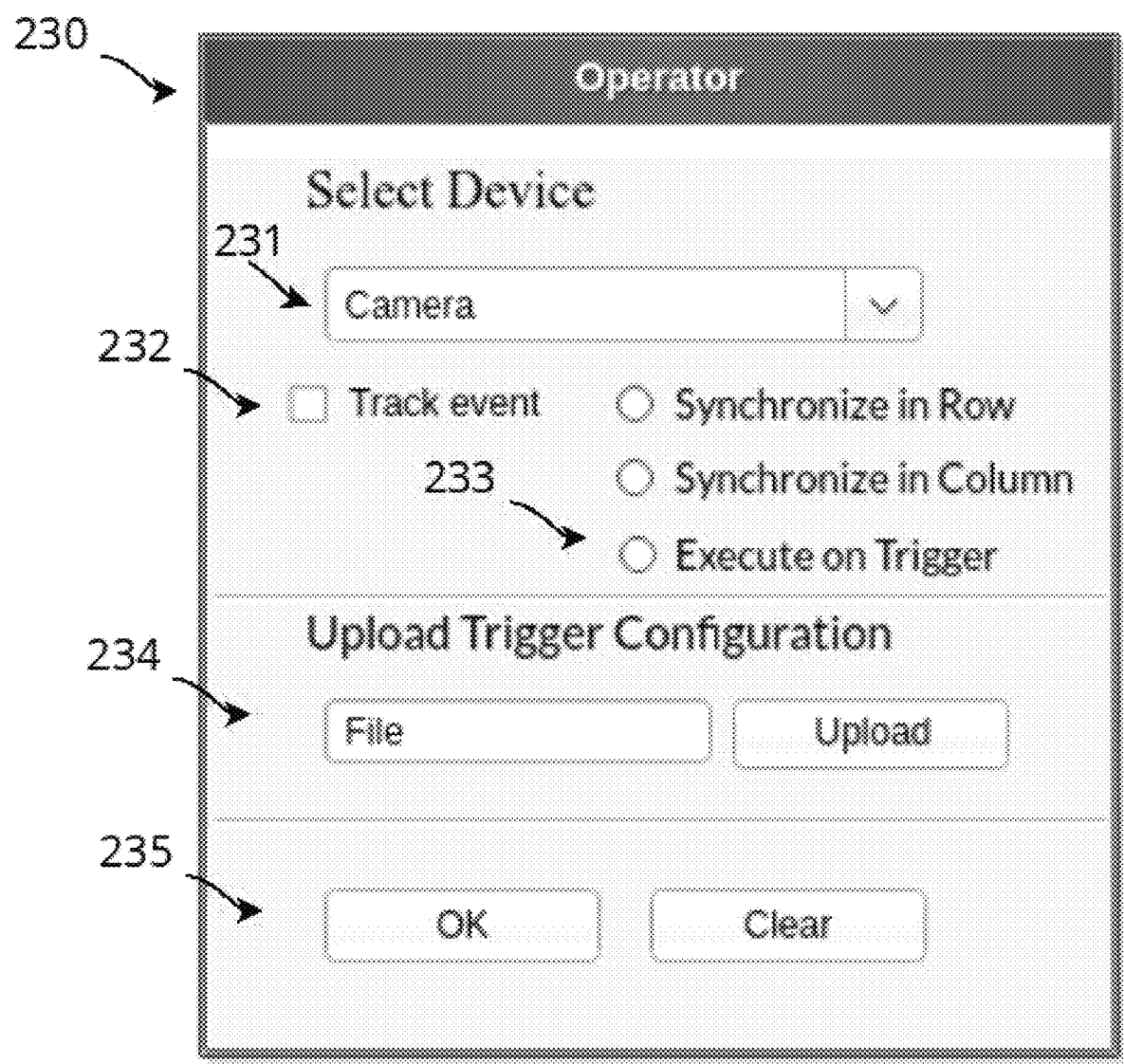
FIG. 13 demonstrates a typical configuration interface for the physical workflow operators, according to an exemplary embodiment of the invention.

FIG. 13 demonstrates a typical configuration interface for the physical workflow operators. A configuration interface 230 is used to configure physical operators such as physical operator 207, 209, and 211. The configuration interface 230 displays a device selection option 231 that is provided in a typical embodiment as a drop down menu that displays registered devices in microcontroller 205. A track event option 232 allows for sensors that have the capacity for tracking (e.g. motorized cameras, etc.) to track an event. A synchronization option 233 allows for the execution to start or end given a particular trigger or synchronization with other operators on the row or on the column where the operator is positioned. Such configuration synchronization creates a dependency between operators.

The synchronization on column or row depends on either another operator having a trigger or staring or ending conditions of the operators in the row or the column. An upload configuration 234 allow for a configuration file to establish specific details of the trigger configuration such as textual parameter image processing configuration, sound processing configurations among other types of sensor configurations. On the upload configuration 234 file, the start and ending conditions as well as tracking parameters. The tracking parameters are processed depending on whether the A track event option 232 is enabled.

Figure 14:
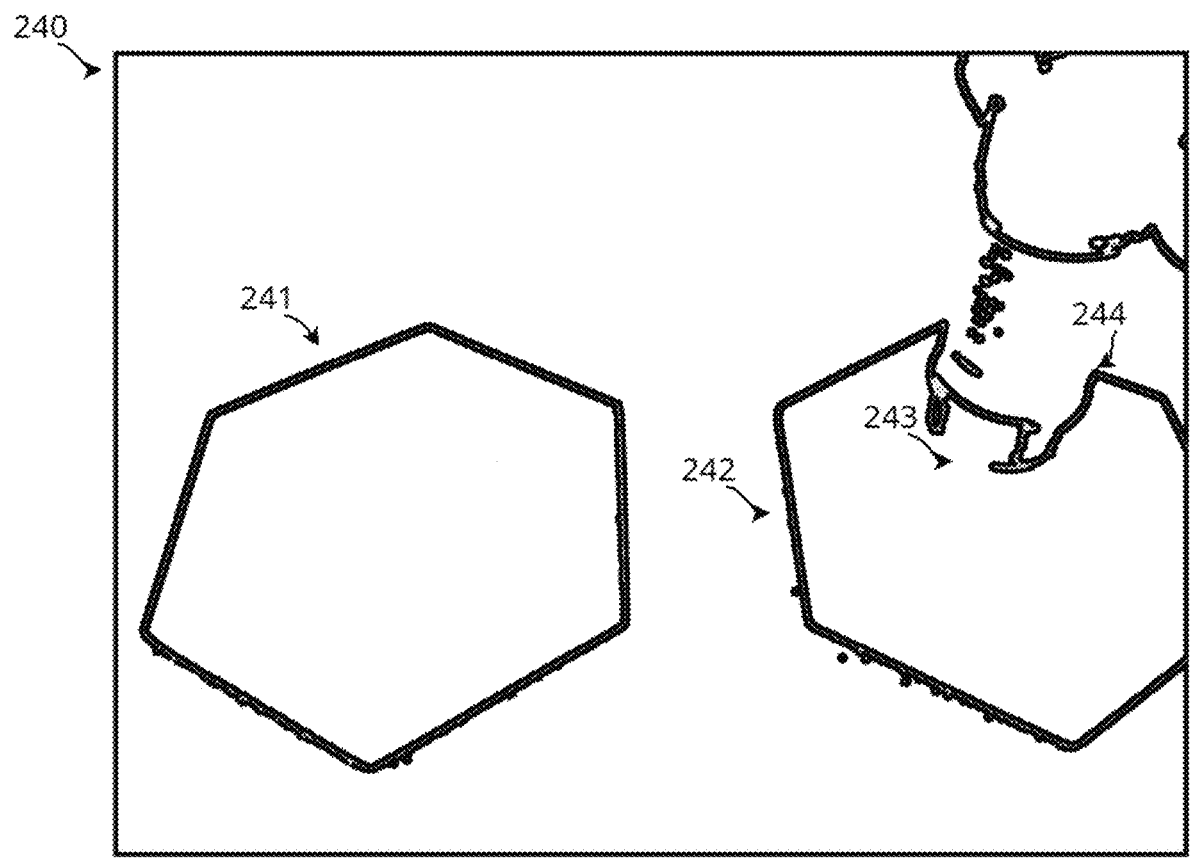
FIG. 14 shows a trigger of an image that is processed from a visual sensor, according to an exemplary embodiment of the invention.

FIG. 14 shows a trigger of an image that is processed from a visual sensor. An image 240 displays a common scenario where a sensor has a baseline 241. In this representation it is a visual capture of a hexagonal object. This object can be stored or come from a series of captured frame. The trigger 242 consists of the baseline 241 from a previous frame or stored representation that has an object 243 that is crossing over an edge 244. The object 243 over the edge 244 gives the trigger 242 its function of differing from baseline 241. Other triggers can be specified in a similar manner trigger on other sensors such as sound. Alternatively thresholds can be placed for other types of sensors such as temperature, moisture, etc. where the sensor can reach a threshold which can serve as a trigger. The trigger can also be used to start or end the tracking of an object as specified in upload configuration 234 file.

Figure 15:
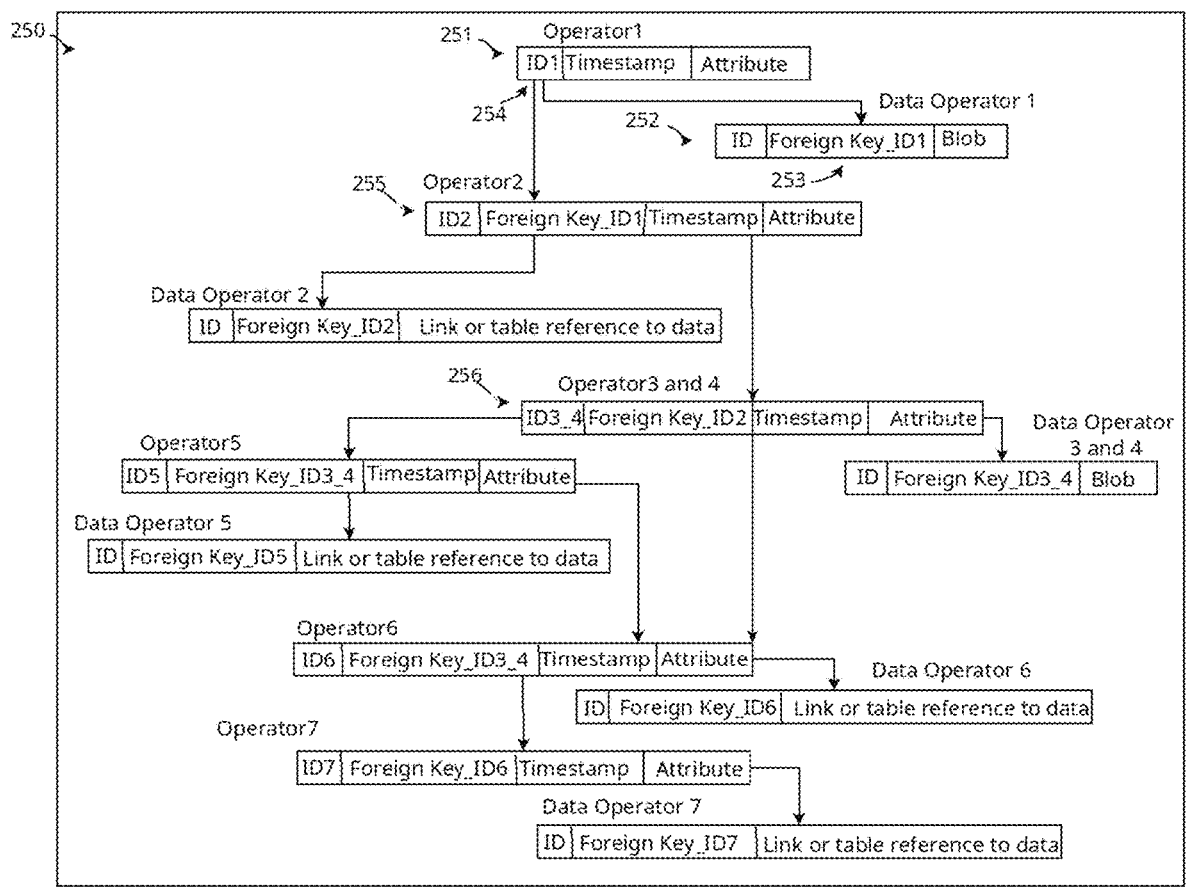
FIG. 15 shows the database structure generated from the process flow of FIG. 12, according to an exemplary embodiment of the invention.

FIG. 15 shows the database structure generated from the process flow of FIG. 12. The database structure 250 forms a hierarchical tree like structure based on the graphical representation of a process flow or workflow. The database structure 250 is tree like in nature but can figure multiple starting or root nodes depending on how many starting branches are identified when the graphical interface is scanned from left to right by the database creation process. The table 251 corresponds to the first operator in the graphical process of FIG. 12 when processed in the direction of the workflow as represented by arrow 203.

The table 251 represents a metadata entry that characterizes the table normalization process required for the hierarchical structure defined by the workflow as represented by arrow 203. A table 252 represents the actual data acquired or processed by the underlying process of the workflow. Table 252 is linked to table 251 by a foreign key 253 that represents that tables pointer to primary key ID 254. The hierarchical relationship is shown between table 251 and a table 255 that represents an operator in a subsequent grid location 224 as established by vertical line 222. The foreign key insertion in the table is based on edges 202 and on special configurations given by synchronization option 233 when the synchronize row option is selected A further normalization operation is shown in a table 256 where two operators are on the same column as determined by vertical line 222 at each side of the two contiguous operators in a vertical direction. The merging of the tables is based on synchronization option 233 when the synchronize column option is selected. Note that this process of determining a hierarchical structure is not limited to structured query language (SQL) databases. This also can apply to NOSQL and even unstructured databases. On the case of the unstructured data the tables can represent a file structure and the foreign key can be the file name with row information.

Figure 16:
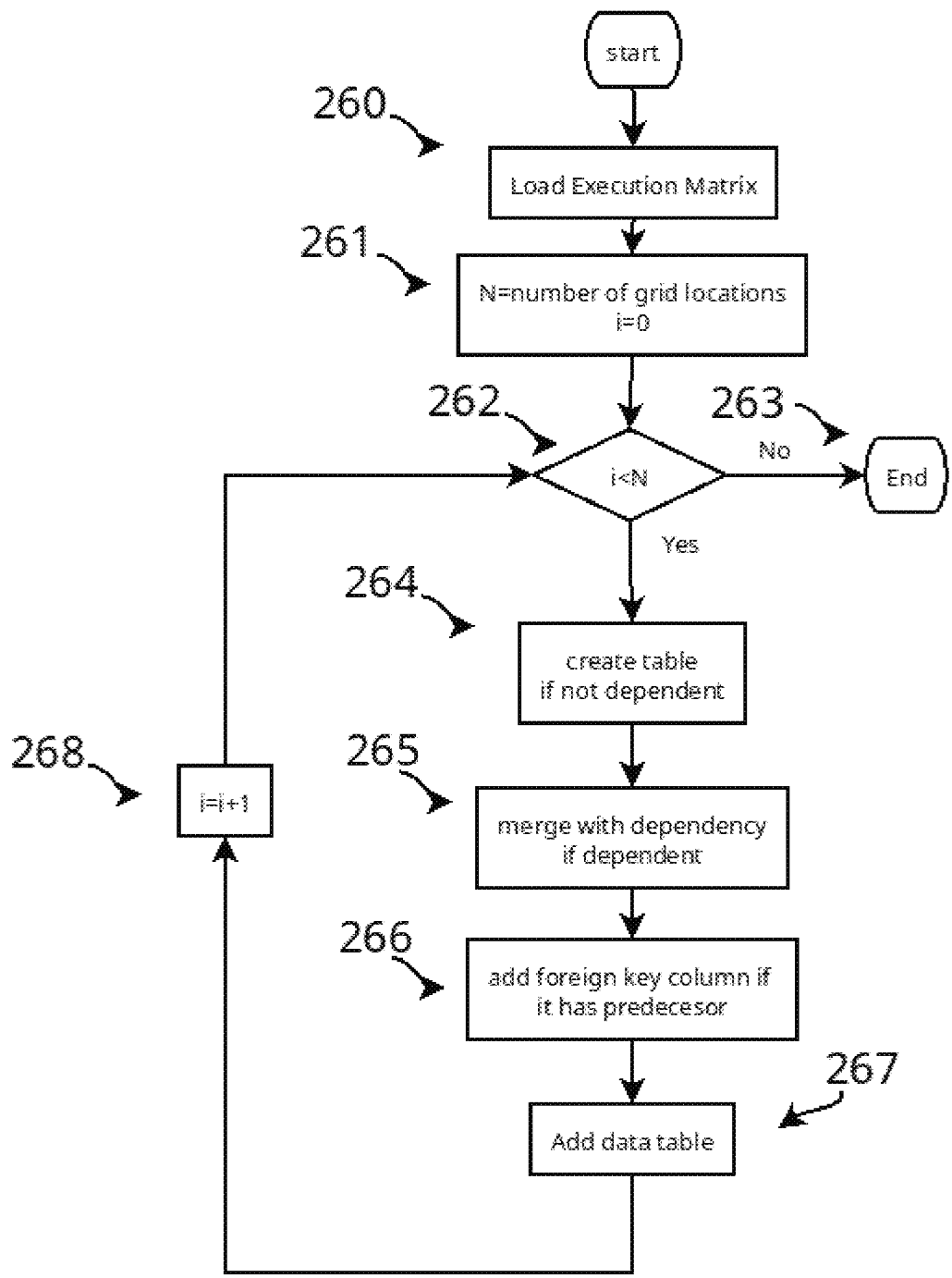
FIG. 16 gives a process description of reading the execution matrix to create the database structure, according to an exemplary embodiment of the invention.

FIG. 16 gives a process description of reading the execution matrix to create the database structure. The process starts with loading the execution matrix 24 in a step 260. following step 260 is an initialization step 261 that counts the total number of grid locations 224 and initializes the counter to zero. Once the initialization step 261 is finished the counter is verified in a step 262 that is less than the total number of grid locations calculated in step 261. If the condition of step 262 is not met then it implies that all the grid locations 224 have been processed and the process culminates at a step 263 that signals the exit to the processing program.

If the condition in step 262 is met then it goes to a step 264 creates the table for the operator if it is determined that the operator does not have a columnar codependency of a previously created operator in the column. After step 264 is finished a step 265 merges the operator attributes with a previously created table if the operator is found to be dependent on that operator for which the table was created. A step 266 follows step 265 where a foreign key attribute is added as a column to the table if it is determined that it has a predecessor operator. The step 266 is followed by a step 267 where the table on which the actual data is to be stored is created. A step 268 closes the loop by incrementing the counter indicating that the previous steps 264 to step 267 have concluded and returns to the decision 262 to test if the process has finished or not.

Figure 17:
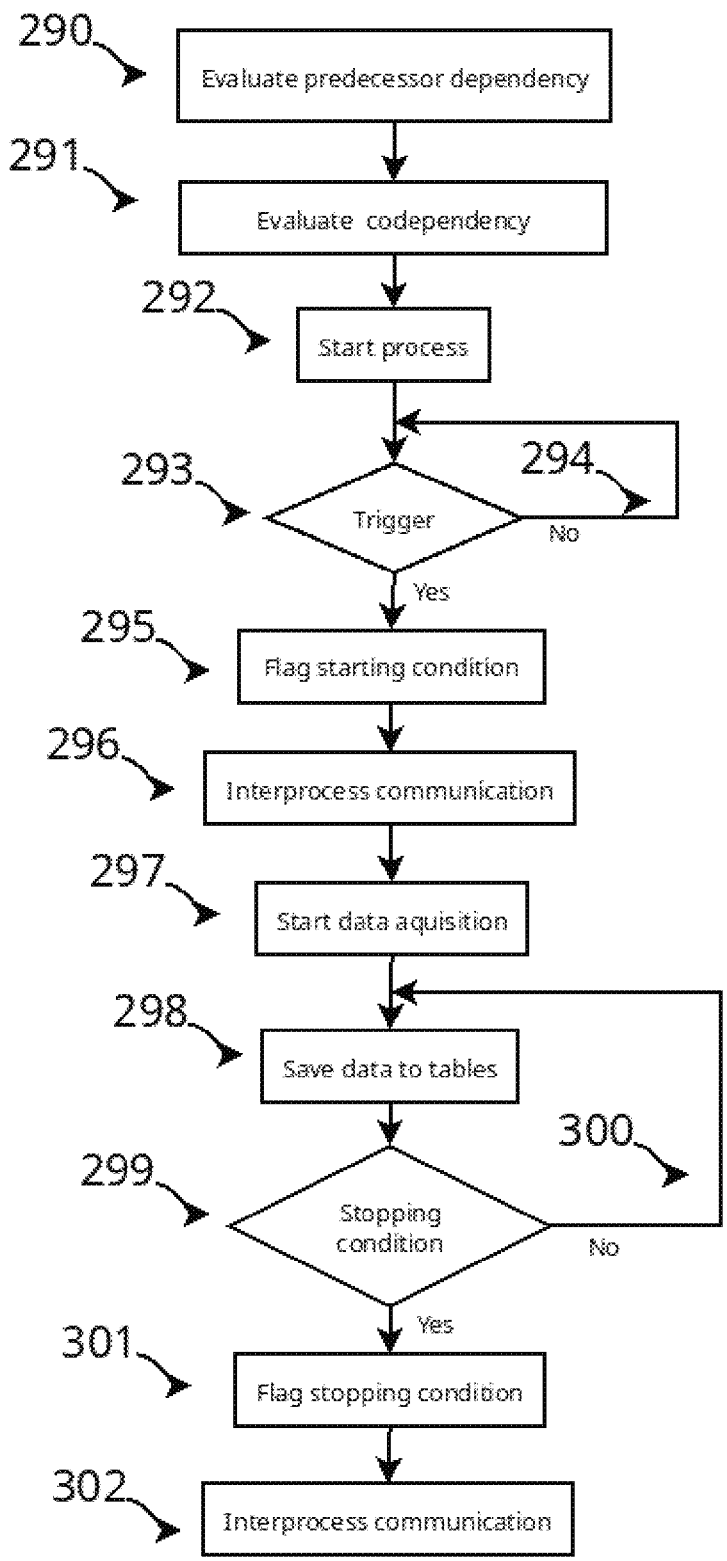
FIG. 17 demonstrates the process carried by an individual operator on execution of the process to satisfy predecessor and columnar dependencies, according to an exemplary embodiment of the invention.

FIG. 17 demonstrates the process carried by an individual operator on execution of the process to satisfy predecessor and columnar dependencies. The process starts with a step 290 that evaluates whether the operator is a starting point or depends on a previous operator. This step requires the analysis of the execution map to determine predecessors based on previous columns and the respective position of the predecessor with regards to the current operator under analysis. A step 291 placed after step 290 determines the type of dependency that the current operator has. The dependency can be columnar, predecessor type dependencies, start synchronized upon starting the process or start synchronized upon a particular event (e.g. start upon detection of occlusion, pattern recognition, etc.) or upon finishing processing. The process is then launched in a step 292. A step 293 is a condition that corroborates if the condition to start processing has been triggered. If the condition is not triggered a loop 294 is executed to check the condition again until it is triggered.

If the condition is triggered step 293 gives way to a step 295 that places a flag that the process has started. The flag of step 295 is communicated in step 296 through an inter process communication to other processes. This communication is not limited to processes in the same computer and can be communicated through other means such as sockets to processes on other computer systems. Once step 295 is executed a step 296 starts the data acquisition or data processing steps. A step 298 then saves the information to the appropriate hierarchical table. A step 299 corroborates if a stopping condition is met. If the condition is not met a loop 300 repeats the cycle of corroboration. If the stopping condition is met a step 301 flags the stopping condition and a step 302 communicates the stopping condition to other processes in a similar fashion as step 296. At this point the process exits.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. A method for information storage in a database through analysis of a transactional workflow on a graphical user interface, said method comprising:
using at least two sensors;
using at least one processor, each said sensor connected to at least one said processor;
accessing at least one database;
providing
an application interface to said sensors that provides a graphical
representation of said transactional workflow, wherein said application interface contains a canvas graphical representation where one or more specific functionality icons are placed on said canvas, with each said specific functionality icon representing a
configuration interface that generates a configuration for said icon, where one of said functionality icons contains the configuration for a specific sensor, wherein said specific sensors are configured to track a specific event that is interlinked by one or more program execution links;
wherein said canvas is divided into columns and rows representing a respective grid location execution slot identified by the grid location where said slot is placed in said canvas, and where said specific functionality icons representing a configuration interface of a data operation and information acquisition from one said sensor are interlinked by one or more of said program execution links across said grid locations on said canvas;
wherein a track event option uses the sensors to track an event linked to a synchronization option and starts or ends a process given a particular sensor's trigger, creating a dependency between different operators;
analyzing said transactional workflow so as to insert data on the database tables based on the properties of each of the operators in the workflow as a function of said program execution dependency between sensor triggers in said configuration interface;
analyzing said transactional workflow to determine when each said specific functionality icon placed within a grid location execution slot on said canvas has a predecessor operator; and
adding a foreign key attribute to the workflow table column based on said dependency of the triggers in said sensor functionality icon configuration interface of the grid location where any said dependency is found.

2. The method of claim 1 wherein:
said sensors are comprised of one or more of the following types of sensors:
visual or thermal cameras, sound, temperature, moisture, motion, interrupters or similar; and
said transactional workflow is analyzed to determine when each said specific functionality icon placed within a grid location execution slot on said canvas has a dependency across grid locations; and
the data is inserted on the database tables when there are no said dependencies.

3. The method of claim 2 wherein:
said transactional workflow is analyzed to determine when each said specific functionality icon placed within a grid location execution slot on said canvas has a row codependency from a previously created operator along said column; and
said analysis inserts the data on the database tables with the operator attributes and a corresponding foreign key column from a previously created table when the operator is found to be dependent on the database table created for the previous row operator.

4. The method of claim 2 wherein:
said transactional workflow is analyzed to determine when each said specific functionality icon placed within a grid location execution slot on said canvas has a dependency across grid locations; and
the data is inserted into the data tables within said databases with the appropriate dependency as well as any applicable foreign key columns.

5. The method of claim 4 wherein:
said transactional workflow is analyzed to determine when each said specific functionality icon placed within an execution slot on said canvas has a columnar codependency from a previously created operator along said column; and said analysis inserts the data on the database tables with the operator attributes and corresponding foreign key column from a previously created workflow table operation when the operator is found to be dependent on the database table created for the previous operator.

6. A non-transitory computer-readable medium embodying a program executable by at least one computing device, the program when executed causing said at least one computing device to do the following:

using at least two sensors;

using at least one processor, each said sensor connected to at least one said processor;

accessing at least one database;

providing an application interface to said sensors that provides a graphical representation of said transactional workflow, wherein said application interface contains a canvas graphical representation where one or more specific functionality icons are placed on said canvas, with each said specific functionality icon representing a configuration interface that generates a configuration for said icon, where one of said functionality icons contains the configuration for a specific sensor, wherein said specific sensors are configured to track a specific event that is interlinked by one or more program execution links;

wherein said canvas is divided into columns and rows representing a respective grid location execution slot identified by the grid location where said slot is placed in said canvas, and where said specific functionality icons representing a configuration interface of a data operation and information acquisition from one said sensor are interlinked by one or more of said program execution links across said grid locations on said canvas;

wherein a track event option uses the sensors to track an event linked to a synchronization option and starts or ends a process given a particular sensor's trigger, creating a dependency between different operators;

analyzing said transactional workflow so as to insert data on the database tables based on the properties of each of the operators in the workflow as a function of said program execution dependency between sensor triggers in said configuration interface;

analyzing said transactional workflow to determine when each said specific functionality icon placed within a grid location execution slot on said canvas has a predecessor operator; and adding a foreign key attribute to the workflow table column based on said dependency of the triggers in said sensor functionality icon configuration interface of the grid location where any said dependency is found.

* * * * *